United States Patent [19]

Abe et al.

[11] Patent Number: 4,497,003
[45] Date of Patent: Jan. 29, 1985

[54] DISC POSITIONING DEVICE

[75] Inventors: Masayuki Abe, Yokohama; Junichi Ikoma, Yokosuka; Kenzi Abiko, Yokohama, all of Japan

[73] Assignee: Hitachi, Ltd., Tokyo, Japan

[21] Appl. No.: 386,277

[22] Filed: Jun. 8, 1982

[30] Foreign Application Priority Data

Jun. 10, 1981 [JP] Japan ................... 56-88124

[51] Int. Cl.³ .................. G11B 5/012; G11B 5/82; B65D 85/30
[52] U.S. Cl. ................... 360/97; 206/444; 360/135
[58] Field of Search ............. 360/97, 98, 99, 132, 360/133, 135, 86; 206/444

[56] References Cited

U.S. PATENT DOCUMENTS

| | | | |
|---|---|---|---|
| 4,091,454 | 5/1978 | Kauffmann | 360/135 |
| 4,320,425 | 3/1982 | Hall | 360/97 |
| 4,391,543 | 7/1983 | Elsing | 206/444 |

*Primary Examiner*—Robert Martin Kilgore
*Attorney, Agent, or Firm*—Antonelli, Terry & Wands

[57] ABSTRACT

A disc positioning device for positioning a disc having a center opening with respect to a spindle for driving the disc for rotation by bringing the center axes thereof into alignment with each other. An adapter in the form of a hemispherical body of a diameter greater than that of the center opening of the disc is mounted on the spindle in such a manner that the center of a spherical body from which the hemispherical body of the adapter is severed coincides with the center axis of the spindle at all times. The adapter is urged by a spring to be biased with the center thereof serving as the center of rotation.

1 Claim, 4 Drawing Figures

DISC POSITIONING DEVICE

FIELD OF THE INVENTION

This invention relates to positioning devices for a rotary disc of an audio record player, a video disc player, etc., and more particularly it deals with a disc positioning device of the type having an adapter interposed between the head of a spindle and the opening in a disc for bringing discs having openings of different diameters into alignment with the spindle by fitting the latter into the former.

DESCRIPTION OF THE PRIOR ART

Figure 1:
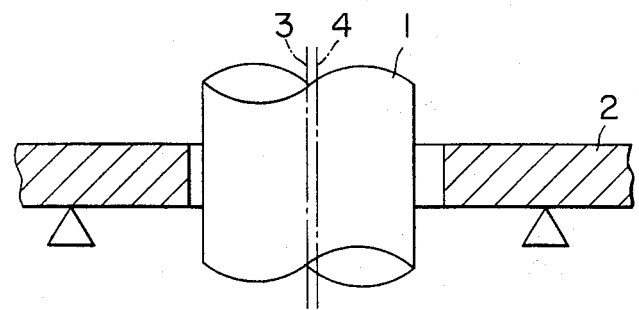
FIGS. 1 and 2 are sectional views of disc positioning devices of the prior art.

FIG. 1 shows a disc positioning device of the prior art in a sectional view, in which a spindle 1 is adapted to be fitted in an opening formed in a disc 2. In this type of disc positioning device, difficulties would be experienced in bringing the center 3 of the spindle 1 into alignment with the center 4 of the disc 2 if the disc 2 shows variations in the diameter of the opening.

Figure 2:
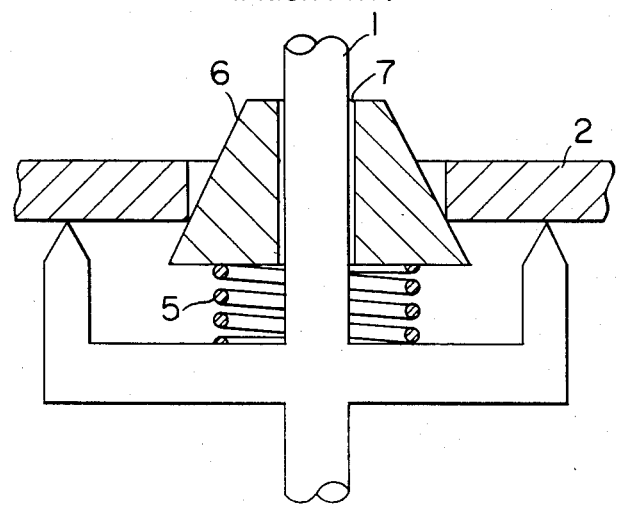

FIG. 2 shows, in a sectional view, Japanese Utility Model Laid-open No. 33407/78 which represents an improvement in the prior art shown in FIG. 1. As shown, an adapter 6 capable of moving vertically in aliding movement with respect to the spindle 1 by the biasing force of a spring 5 and tapering in its outer periphery to accommodate variations in the diameter of the opening of the disc 2 is provided to bring the spindle into alignment with the opening in the disc. In the device, it is desired that the gap between the opening in the adapter 6 for receiving the spindle 1 and the spindle 6 be eliminated. However, it is necessary that a gap of a large size be provided in view of variations in the size of the gap inevitably occurring in production and there is a difference in the coefficient of thermal expansion between the spindle 1 and adapter 6. Also, the gap increases in size with time as wear is caused on the adapter and the spindle during use. Thus, difficulties have been experienced in obtaining accurate positioning of the disc by the device of the prior art.

SUMMARY OF THE INVENTION

This invention has been developed for the purpose of obviating the aforesaid problem of the prior art. Accordingly the invention has as its object the provision of a disc positioning device capable of bringing the center axis of a spindle into alignment with the center of a center opening in the disc without any trouble.

The aforesaid object is accomplished according to the invention by providing a mechanism whereby a deviation in axis caused by a gap in size between openings in an adapter and the spindle can be accommodated by mounting the adapter on the spindle in a tilting position and a deviation in axis caused by a difference between the diameter of the adapter and the diameter of the center opening of the disc can be accommodated by imparting to the adapter a hemispherical body centered at a point equidistantly spaced apart from end portions of one of the openings in the hemispherical body and having a diameter greater than that of the center opening of the disc.

The adapter according to the invention has a curved surface formed by the hemispherical body and larger in diameter than the center opening of the disc and formed inside the hemispherical body with a first opening of a diameter greater than the diameter of the spindle having opposite ends forming two circles connected together by a straight line bisected at the center of the hemispherical body, and a second opening connecting one end of the first opening to the inclined or curved surface of the hemispherical body.

Means is provided for biasing the adapted to force same against the disc and also for rotating the adapter about a center which is the center of the semispherical body.

DESCRIPTION OF THE PREFERRED EMBODIMENT

Figure 3:
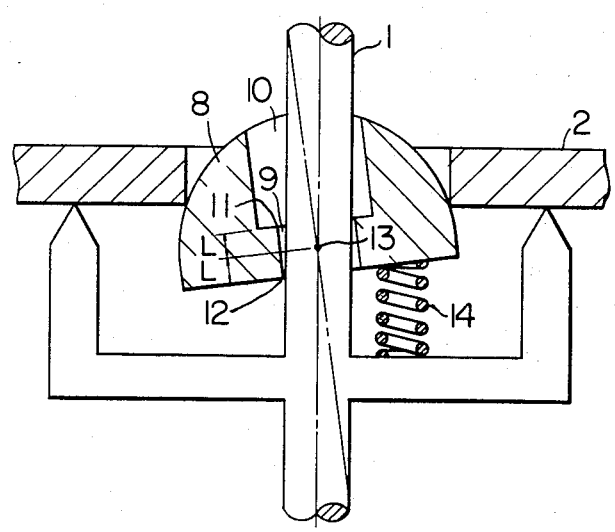
FIGS. 3 and 4 are a sectional view and a perspective view, respectively, of the disc positioning device comprising one embodiment of the invention.
Figure 4:
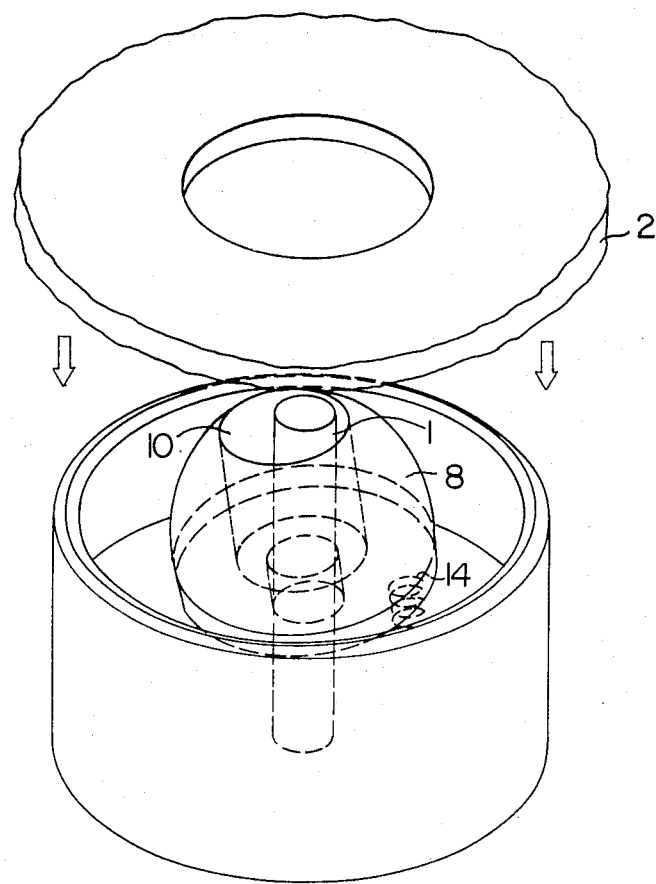

A preferred embodiment of the invention will now be described by referring to FIGS. 3 and 4. FIG. 3 is a sectional view taken along a plane including the center axis of a spindle 1, and FIG. 4 is a perspective view. As shown, the spindle 1 and a disc 2 are similar to those shown in FIG. 2. The numeral 8 designates an adapter according to the invention in the form of a hemisphere of a diameter greater than that of an opening in the disc 2 left over by removing a part of a lower half portion of a spherical body. The adapter 8 of the hemispherical body is formed in the central portion with a vertical through hole or a first opening 9 of a diameter greater than the diameter of the spindle 1, and a hole or a second opening 10 greater in diameter than the first opening 9 and located thereon which provides end portions 11 and 12 of the first opening 9 equidistantly spaced apart from a center 13 which is the center of the spherical body from which the hemispherical adapter 8 is severed. The numeral 14 designates a spring mounted at one portion of the undersurface of the semispherical adapter 8 to urge the adapter to move upwardly at one end portion thereof when the adapter 8 is mounted on the spindle 1 so that the adapter 8 will tilt into contact with the spindle 1 at the upper and lower ends of the openings of the spindle 1.

The first opening 9 of the adapter 8 is greater in diameter than the spindle 1, but the center 13 of the spherical body from which the hemispherical body 8 is severed is located on the center axis of the spindle 1 at all times because the adapter 8 is in contact with the spindle 1 when the latter is in a tilting position, thereby eliminating any deviation of the center axis of the adapter 8 from that of the spindle 1. The adapter 8 tilts while its center is located at the center 13 of the spherical body, so that points of contact on the adapter 8 with the edge of the opening in the disc 2 are equidistantly spaced apart from the center 13 of the spherical body. Thus the center axis of the disc 2 coincides with that of the spindle 1.

In the embodiment shown and described hereinabove, no means is provided for avoiding dislodging of the adapter 8 upwardly of the spindle 1 in the drawings. However, if necessary, the spindle 1 may be formed with a flange of a diameter greater than that of the second opening 10 of the adapter 8 to serve the aforesaid purpose.

From the foregoing description, it will be appreciated that the invention enables the center axes of the spindle and the disc to be brought into alignment with each other that has hitherto been impossible in the prior art, without varying the number of parts necessary for the construction. This is conductive to minimization of wow and flutter in the basic frequency of rotation of the disc.

What is claimed is:

1. A disc positioning device comprising:
   (a) a spindle connected to a drive source of a disc;
   (b) an adapter mounted on said spindle formed with an inclined surface engaging the edge of a center opening formed in said disc; and
   (c) biasing means urging said adapter against said disc; wherein the improvement resides in that:
   (d) said inclined surface is constituted by a part of a spherical surface of a diameter greater than that of the center opening of said disc;
   (e) said adapter is formed inside said spherical surface with a first opening having end portions constituting opposite ends of said adapter in the form of circles greater in diameter than said spindle, a straight line connecting the centers of said circles together being bisected at the center of said spherical surface;
   (f) said adapter is further formed with a second opening connecting said spherical surface to one of the opposite ends of said first opening; and
   (g) said biasing means being also operative to impart to said adapter a force tending to rotate same about the center of said spherical surface.

* * * * *